US012251007B1

(12) United States Patent
Kelley et al.

(10) Patent No.: US 12,251,007 B1
(45) Date of Patent: Mar. 18, 2025

(54) ROTATING INTERFACE FOR MULTIDIRECTIONAL HANDHELD EYE MAKEUP APPLICATION

(71) Applicants: L'Oreal, Paris (FR); Prinker Korea Inc., Gyeonggi-do (KR)

(72) Inventors: Maya Kelley, San Francisco, CA (US); Fred Orsita, Wayne, NJ (US); Juwan Hong, Jersey City, NJ (US); Kyu Suk Lee, Suwon-si (KR); Yong Min Jeong, Suwon-si (KR); Tae Sik Yun, Seoul (KR); Jong In Lee, Suwon-si (KR)

(73) Assignees: L'Oreal, Paris (FR); Prinker Korea Inc., Gyeonggi-do (KR)

( * ) Notice: Subject to any disclaimer, the term of this patent is extended or adjusted under 35 U.S.C. 154(b) by 0 days.

(21) Appl. No.: 18/616,842

(22) Filed: Mar. 26, 2024

(51) Int. Cl.

| | |
|---|---|
| ***A45D 34/04*** | (2006.01) |
| ***B05C 17/02*** | (2006.01) |
| ***B41J 2/01*** | (2006.01) |
| ***B41J 2/135*** | (2006.01) |
| ***B41J 3/36*** | (2006.01) |
| ***B41M 5/00*** | (2006.01) |

(52) U.S. Cl.
CPC .......... *A45D 34/041* (2013.01); *B05C 17/022* (2013.01); *B41J 2/01* (2013.01); *B41J 2/135* (2013.01); *B41J 3/36* (2013.01); *B41M 5/0047* (2013.01)

(58) Field of Classification Search
CPC ................ A45D 34/041; A45D 40/261; A45D 2034/005; B41M 5/0041; B41M 5/0047; B41J 3/28; B41J 3/36; B41J 2/16535; B41J 2/135; B41J 2/01; B05C 17/02; B05C 17/022
USPC ............ 401/208, 219, 220; 347/2, 108, 109; 400/88, 691; 358/473; 346/143
See application file for complete search history.

(56) References Cited

U.S. PATENT DOCUMENTS

| | | | | |
|---|---|---|---|---|
| 6,312,124 | B1 | 11/2001 | Desormeaux | |
| 6,543,893 | B2 * | 4/2003 | Desormeaux | B41J 2/16505 347/109 |
| 2003/0037448 | A1 | 2/2003 | Saksa | |
| 2017/0157962 | A1 * | 6/2017 | Rabe | B41J 2/16547 |
| 2020/0171831 | A1 | 6/2020 | Lee et al. | |
| 2024/0108119 | A1 | 4/2024 | Hong et al. | |

(Continued)

FOREIGN PATENT DOCUMENTS

WO 2024118438 A1 6/2024

OTHER PUBLICATIONS

Casey Barbarino et al., U.S. Appl. No. 18/340,324, filed Jun. 23, 2023, 50 pages.

(Continued)

*Primary Examiner* — David J Walczak
(74) *Attorney, Agent, or Firm* — Christensen O'Connor Johnson Kindness PLLC

(57) ABSTRACT

A cosmetic deposition device comprises a housing; a printhead within the housing, the printhead including one or more nozzle to dispense one or more formulation; an applicator face connected to the housing, wherein an exterior side of the applicator face includes a roller adjacent to the one or more nozzle, and the applicator face is configured to rotate with respect to the housing, and the applicator face is detained at more than one rotational setting with respect to the housing.

19 Claims, 9 Drawing Sheets

(56) References Cited

U.S. PATENT DOCUMENTS

| | | | |
|---|---|---|---|
| 2024/0108199 | A1 | 4/2024 | Culman et al. |
| 2024/0177404 | A1 | 5/2024 | Hong et al. |

OTHER PUBLICATIONS

Casey Barbarino et al., U.S. Appl. No. 18/345,339, filed Jun. 30, 2023, 46 pages.

Juwan Hong et al., U.S. Appl. No. 18/756,104, filed Jun. 27, 2024, 39 pages.

Casey Barbarino et al., U.S. Appl. No. 18/354,929, filed Jul. 19, 2023, 52 pages.

International Search Report and Written Opinion mailed Dec. 4, 2024, issued in corresponding French Application No. 2404833, 6 pages.

* cited by examiner

ROTATING INTERFACE FOR MULTIDIRECTIONAL HANDHELD EYE MAKEUP APPLICATION

SUMMARY

In an embodiment, a cosmetic deposition device comprises a housing; a printhead within the housing, the printhead including one or more nozzle to dispense one or more formulation; an applicator face connected to the housing, wherein an exterior side of the applicator face includes a roller adjacent to the one or more nozzle, and the applicator face is configured to rotate with respect to the housing, and the applicator face is detained at more than one rotational setting with respect to the housing.

In an embodiment, the cosmetic deposition device comprises one or more magnet on the applicator face and one or more magnet on the housing, wherein the one or more magnet on the applicator face and the one or more magnet on the housing provide an attraction force to detain the applicator face with respect to the housing when the one or more magnet on the applicator face is adjacent to the one or more magnet on the housing.

The one or more magnet on the applicator face and the one or more magnet on the housing are at the same radial distance from a center of the housing.

The cosmetic deposition device comprises one or more pairs of diametrically opposed magnets on the applicator face and one or more pairs of diametrically opposed magnets on the housing.

The cosmetic deposition device comprises one or more magnet on an upper side of the applicator face and one or more magnet on a bottom side of the housing.

The one or more magnet on the applicator face or the one or more magnet on the housing are used to determine a rotation position of the applicator face.

In an embodiment, the cosmetic deposition device comprises one or more spring on the applicator face and one or more slot on the housing, wherein the one or more spring on the applicator face and the one or more slot on the housing detain the applicator face at the more than one rotation setting when the one or more spring is engaged on the one or more slot.

The applicator face comprises one or more pairs of diametrically opposed springs and a plurality of slots are provided around an inner circumference of the housing.

The inner circumference of the housing comprises the slots equally spaced along the inner circumference.

The cosmetic deposition device comprises one or more magnet on the applicator face or one or more magnet on the housing used as a magnetic field sensor to determine a rotation position of the applicator face.

The bottom of the housing includes more than one dogs to support the applicator face, a dog including an axially extending neck and a radially extending flange, and the applicator face includes a rim that is engaged with the more than one dogs.

The applicator face includes an opening for the one or more nozzle to dispense one or more formulation therethrough.

In an embodiment, a method of printing a cosmetic style comprises moving a cosmetic deposition device over a surface, wherein the cosmetic deposition device includes a printer and an applicator face including a roller, wherein the roller makes contact with the surface; sensing a direction of the cosmetic deposition device; and depositing a formulation on the surface when the roller is following behind the printer.

The surface is a facial feature.

The cosmetic style is an eyebrow feature or a lip feature.

The method of printing a cosmetic style further comprises, when the roller is not following behind the printer, the device stops depositing the formulation on the surface.

In an embodiment, a method of printing a cosmetic style comprises moving a cosmetic deposition device over a surface, wherein the cosmetic deposition device includes a printer and an applicator face including a roller, wherein the roller makes contact with the surface; via a computing device, providing instructions to rotate the applicator face to a predetermined position; sensing a rotation position of the applicator face is at the predetermined position; and when the rotation position of the applicator face is at the predetermined position, depositing a formulation on the surface.

The method of printing a cosmetic style further comprises sensing a direction of the cosmetic deposition device when being moved over a surface; and when the roller is not following behind the printer, the cosmetic deposition device stops depositing the formulation on the surface.

The method of printing a cosmetic style further comprises, via a computing device, providing a first instruction to move the cosmetic deposition device in a first direction; and after detecting that the cosmetic deposition device has moved in the first direction, providing, via the computing device, a second instruction to move the cosmetic deposition device in a second direction.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
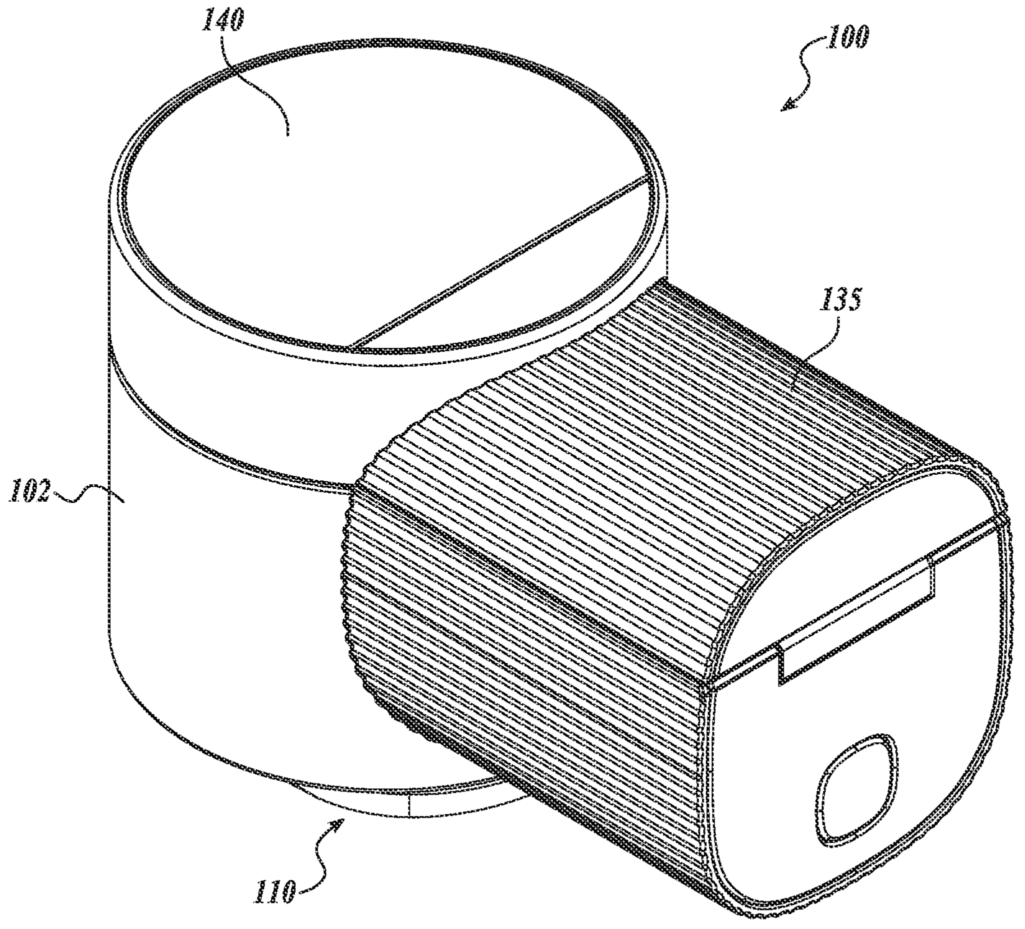
FIG. 1 is a top perspective illustration of a cosmetic deposition device.
Figure 2:
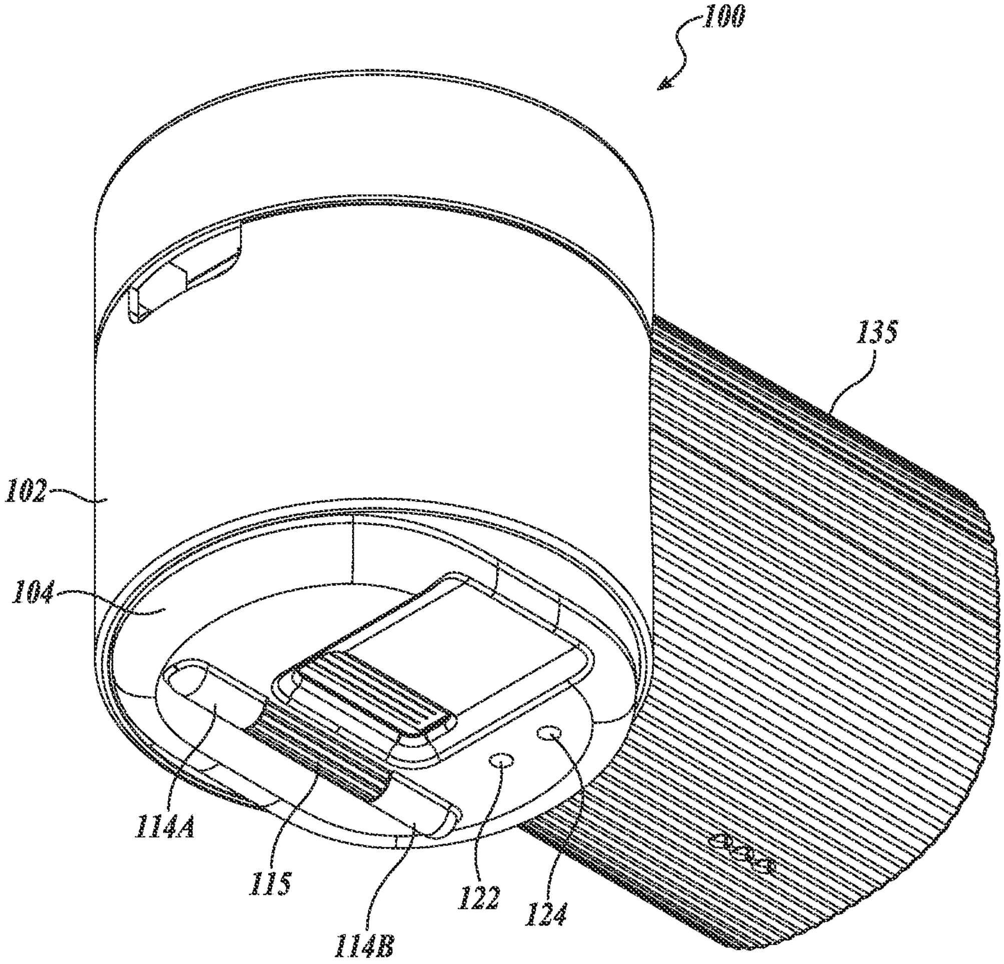
FIG. 2 is a bottom perspective illustration of the cosmetic deposition device of FIG. 1.

The disclosure relates to a cosmetic deposition device 100 used for printing cosmetic styles on a surface, such as skin or the face. As shown in FIGS. 1 and 2, the cosmetic deposition device 100 includes a handle 135, a housing 102 connected to the handle 135, which can be connected at a right angle to the handle 135. In one embodiment, the housing 102 is a cylindrical-shaped housing having a display 140 at one end of the housing and an applicator face 104 at the opposite end from the display 140.

Display 140 of cosmetic deposition device 100 can depict a user interface for a subject to control operations, features, and options of the cosmetic deposition device 100.

Referring to FIG. 2, the applicator face 104 is part of a cosmetic deposition assembly 110 which also includes a printhead 145. The applicator face 104 includes an elongated roller 115 which is placed between two spacers 114A and 114B. The spacers 114A, 114B and the roller 115 extend below a flat surface of the applicator face 104 to keep the bottom of the device separated from the surface.

The printhead 145 is visible through an opening in the applicator face 104. Particularly, rows 106A, 106B, 106C of nozzles of the printhead 145 are visible through the opening in the applicator face 104. The opening in the applicator face 104 allow the rows 106A, 106B, 106C of nozzles to deposit formulation through the opening.

Figure 4A:
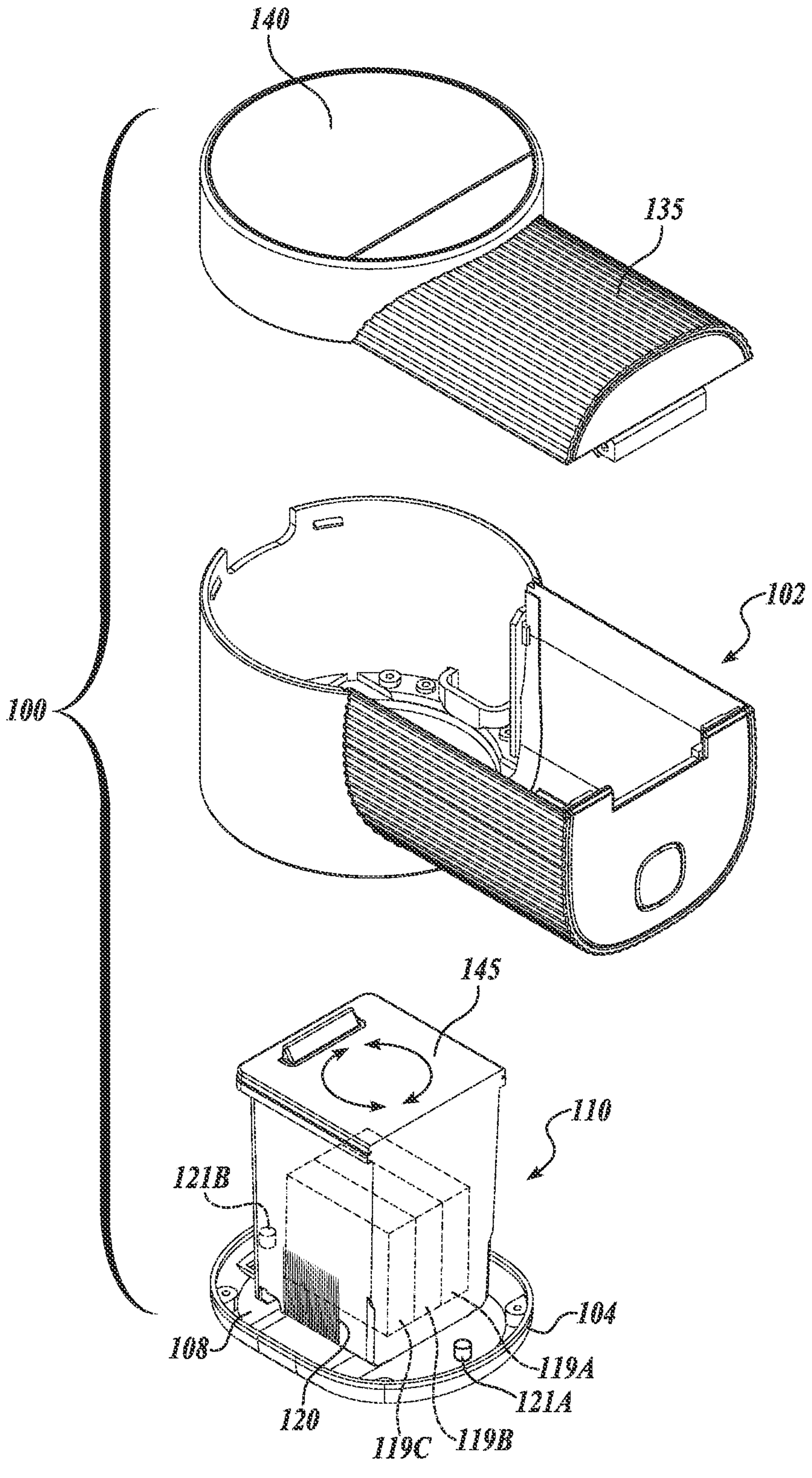
FIG. 4A is an exploded view illustration of a cosmetic deposition device in accordance with an embodiment.
Figure 4B:
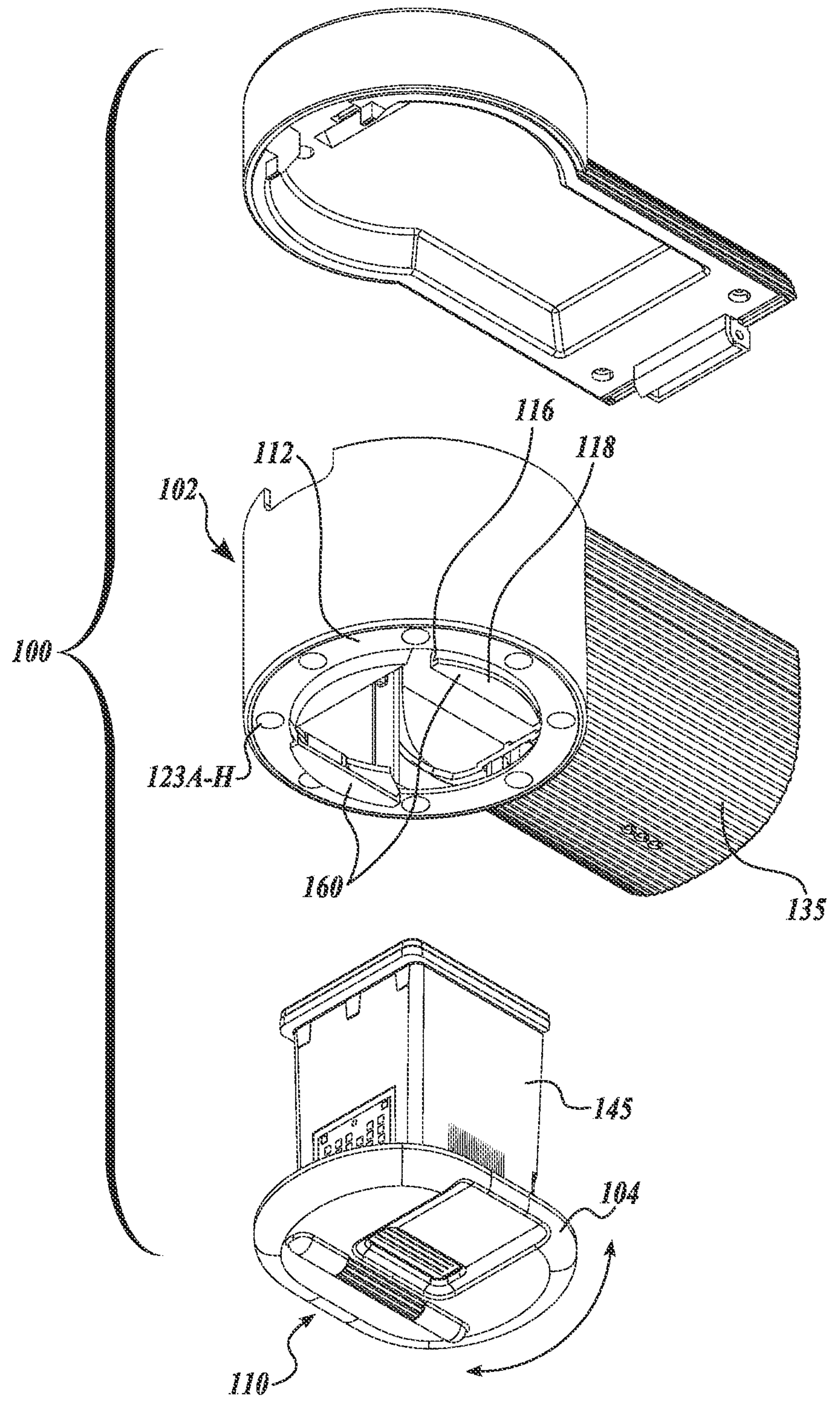
FIG. 4B is an exploded view illustration of the cosmetic deposition device in accordance with the embodiment of FIG. 4A.

Referring to FIGS. 4A and 4B, the cosmetic deposition assembly 110 includes the applicator face 104 and the printhead 145. The printhead 145 includes a printing technology and formulation cartridges 119A, 119B, and 119C. In one embodiment, the print technology employed is generally referred as "inkjet" printing. For example, US 2020/0171831 to Prinker Korea Inc. disclose a printing technology.

Figure 3:
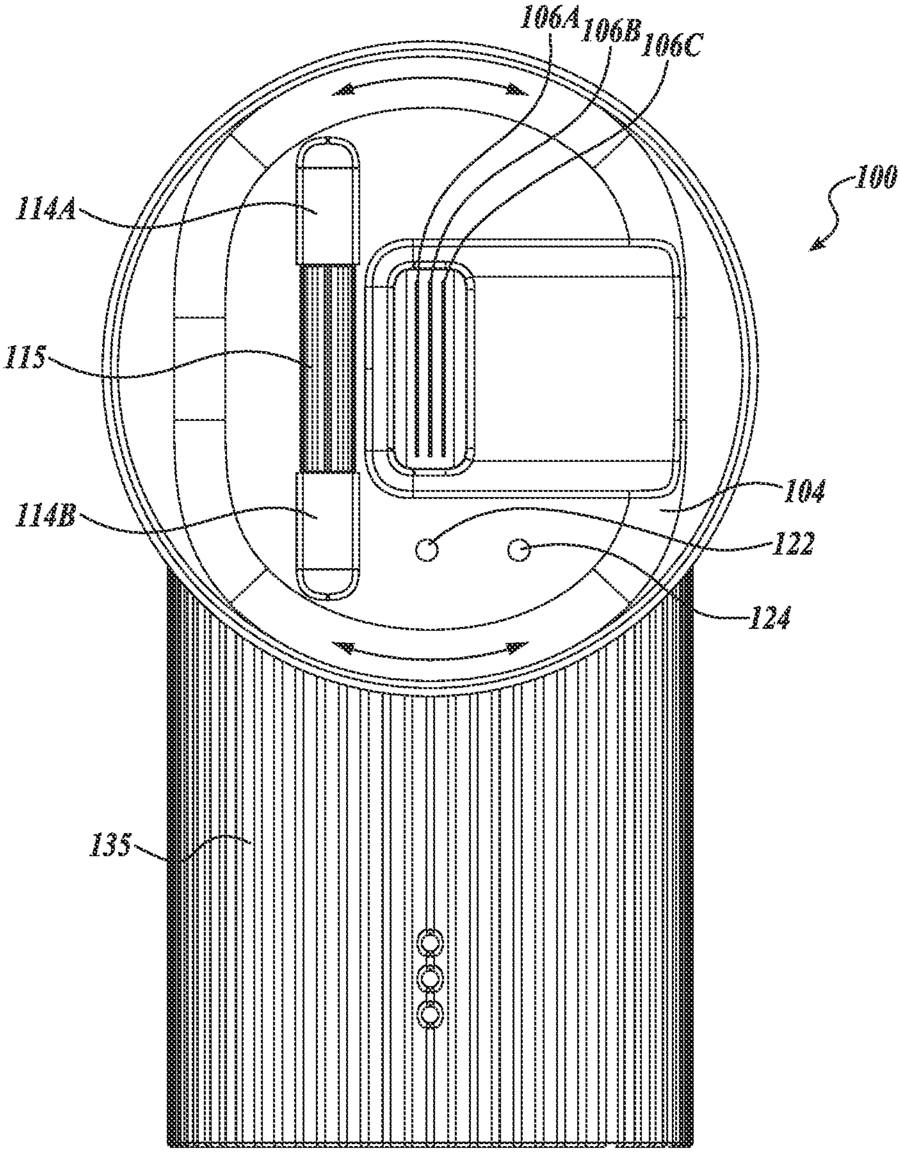
FIG. 3 is a bottom view illustration of the cosmetic deposition device of FIG. 1.

In one embodiment, the printhead 145 includes three rows 106A, 106B, and 106C of nozzles (FIG. 3). Each nozzle row 106A, 106B, and 106C may include up to hundreds of nozzles which may be expressed as "dots per inch" (dpi), for example, 150 dpi, 300 dpi, and 600 dpi. A piezoelectric element is paired with each nozzle, and each of the piezoelectric elements is controlled by one or more processors 120. In one embodiment, each row of nozzles 106A, 106B, and 106C is configured to dispense a single formulation from the corresponding cartridge 119A, 119B, and 119C.

One side of the applicator face 104 is on the exterior and on one end of the housing 102 and a second opposite side of the applicator face 104 is attached to the bottom side of the housing 102. When the cosmetic deposition device 100 is in use, the applicator face 104 maintains contact with a surface via the roller 115 to ensures ensure proper spacing from the surface and smooth translation across the surface. The applicator face 104 includes an opening allowing the rows 106A, 106B, and 106C of nozzles to dispense the formulation onto the surface. To prevent smudging, it is desirable that the cosmetic deposition device 100 is moved in a direction such that the roller 115 follows behind the rows 106A, 106B, 106C of nozzles.

In one embodiment, the applicator face 104 includes a mechanism for rotation of the applicator face 104, independent of the whole cosmetic deposition device 100. This allows makeup to be applied in any direction without changing the orientation of the whole cosmetic deposition device 100.

Figure 5A:
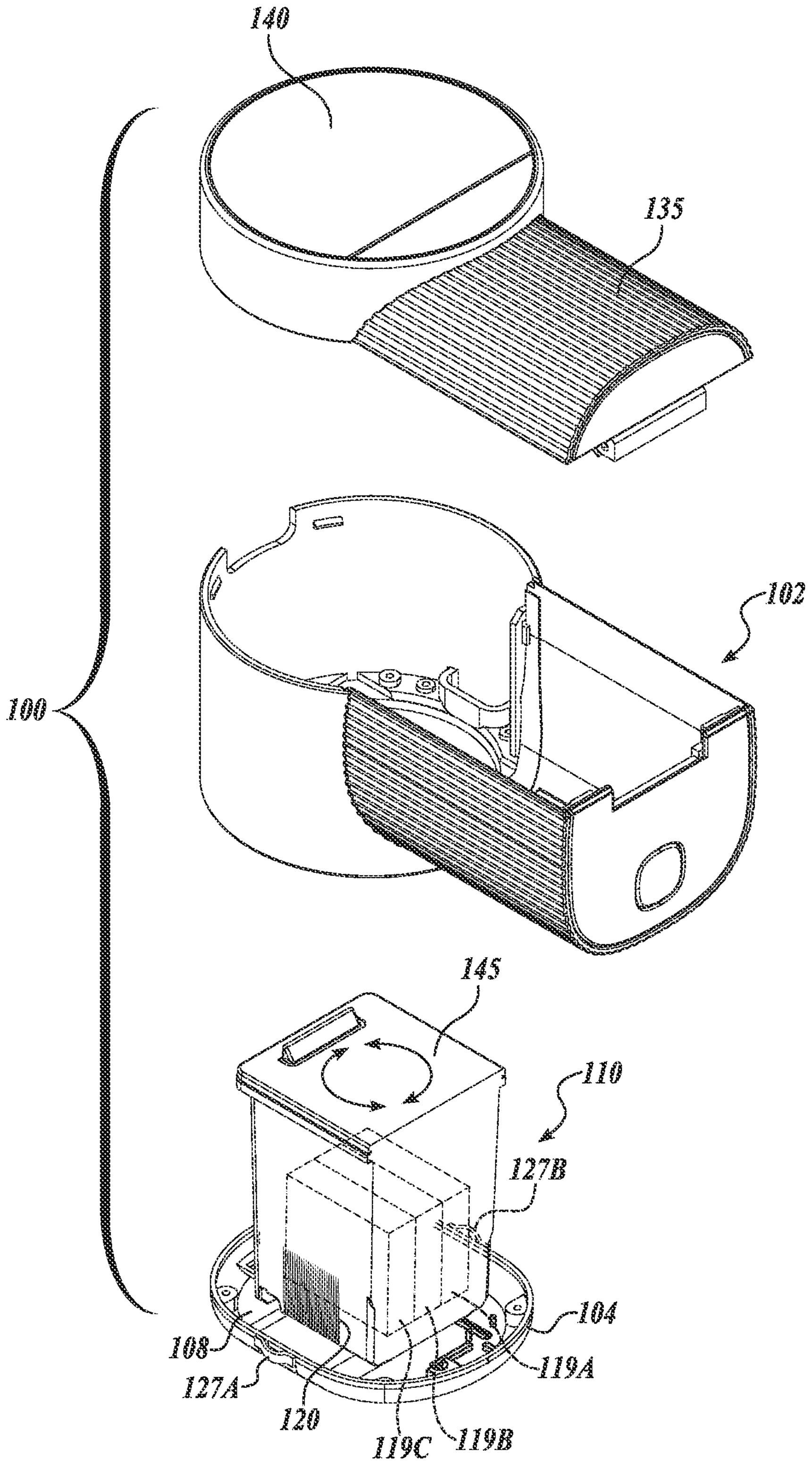
FIG. 5A is an exploded view illustration of a cosmetic deposition device in accordance with an embodiment.
Figure 5B:
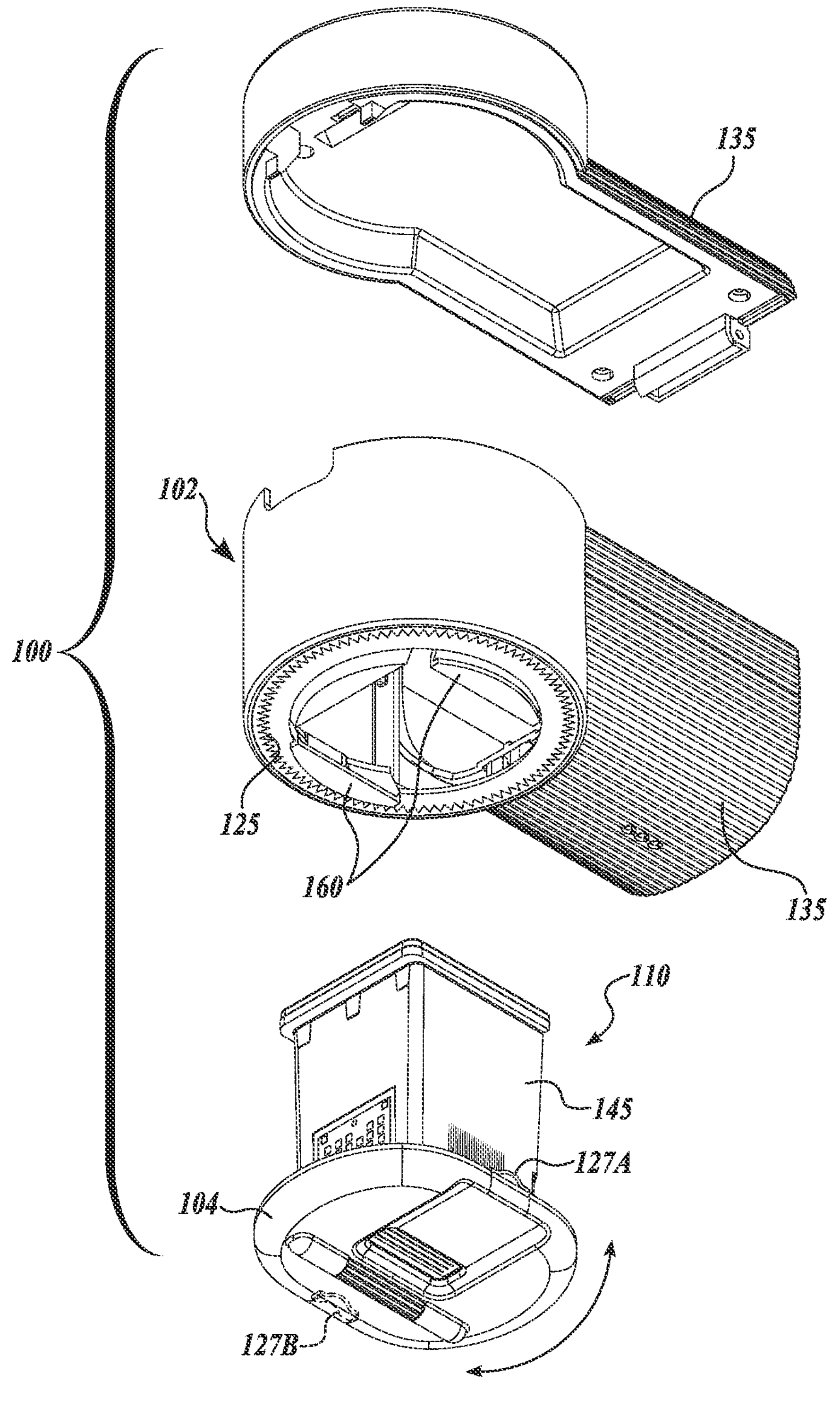
FIG. 5B is an exploded view illustration of the cosmetic deposition device in accordance with the embodiment of FIG. 5A.

As illustrated in FIGS. 4B and 5B, the bottom side of the housing 102 includes a flat annular disk 112 at the inside periphery of the housing 102. The flat annular disk 112 includes a circular opening for the printhead 145. In an embodiment, the printhead 145 can be attached to the applicator face 104 and rotate together with the applicator face 104. In an embodiment, the printhead 145 does not rotate with the applicator face 104.

The flat annular disk 112 includes one or more dogs 160 that support the applicator face 104 while allowing rotation of the applicator face 104 with respect to the housing 102.

In one embodiment, dogs 160 include a neck part 116 extending axially down and being attached along a section of the circular opening in the disk 112. A flange 118 is attached to the neck part 116 at a right angle, so that the flange 118 extends radially outward, but not inward.

The applicator face 104 includes a rim 108 on the interior upper side of the applicator face 104. The flanges 118 can fit below the rim 108 so that the applicator face 104 is supported by the flanges 118 while also allowing rotation of the applicator face 104.

As illustrated in FIG. 4A, in one embodiment, the upper side of the applicator face 104 includes a pair of magnets 121A, 121B placed respectively on opposite sides of the applicator face 104. However, the applicator face 104 can include from one to more than one magnets. In embodiments, magnets can be placed on the applicator face 104 in diametrically opposed pairs.

As illustrated in FIG. 4B, the bottom side of the housing 102 includes a plurality of magnets 123A-H distributed around the circumference of the annular disk 112. The magnets 123A-H can be distributed in diametrically opposed pairs. The magnets 123A-H are placed at the same radial distance from the center as the magnets 121A, 121B.

The polarity of magnets 121A, 121B on the applicator face 104 is opposite to the polarity of magnets 123A-H on the housing 102 to provide attraction forces between magnets 121A, 121B and magnets 123A-H. Therefore, the applicator face 104 is not only capable of rotation with respect to the housing 102 and the cosmetic deposition device 100, but also, the applicator face 104 can be detained in rotational alignment by the attraction of the pair of magnets 121A, 121B to any pair of the magnets 123A-H. There is a resistance to turning the applicator face 104 when the pair of magnets 121A, 121B is aligned to any pair of the magnets 123A-H.

The number of magnets on both the applicator face 104 and the bottom of the housing 102 can vary to increase the holding strength and/or to define more preset rotation positions or both.

In an embodiment, magnets 123A-H can be used to sense the rotational position of the applicator face 104. The cosmetic deposition device 100 uses the rotational position of the applicator face 104 to determine whether the roller 115 is following behind the printing nozzle rows 106A, 106B, 106C.

As illustrated in FIG. 5A, in one embodiment, the applicator face 104 includes a pair of springs 127A and 127B placed on opposite sides of the applicator face 104 in the radial direction. However, the applicator face 104 can have from one to more than one springs. The springs 127A and 127B can be shaped to have a peak in the center with ramped sides leading to the peak. In one embodiment, the peak faces outward in the radial direction.

As illustrated in FIG. 5B, the inside periphery of the bottom edge of the housing 102 is provided with slots 125. Slots 125 are provided completely around the circumference of the housing 102. Each slot 125 is sized to accommodate the springs 127A and 127B, more particularly, the slots 125 are sized to accommodate the peak of the springs 127A and 127B. The slots are oriented to be facing radially inward. As the applicator face 104 is rotated, the springs 127A and 127B become compressed and disengage from slots 125. When rotation is stopped, the 127A and 127B re-engage into corresponding slots 125. Therefore, the springs 127A and 127B on the applicator face 104 are configured to engage and disengage with the slots 125 while turning the applicator face 104.

The applicator face 104 is not only capable of rotation with respect to the housing 102 and the cosmetic deposition device 100, but also, the applicator face 104 can be detained in rotational alignment by the springs 127A and 127B engaging with corresponding slots 125 on the housing 102. There is a resistance to turning the applicator face 104 while the springs 127A, 127B are engaged with the slots 125. The springs 127A and 127B can make a clicking noise as the springs 127A and 127B are rotated until the springs 127A and 127B fall into the desired rotational alignment.

The slots 125 can be magnetized to sense the rotational position of the applicator face 104 with respect to the cosmetic deposition device 100. The cosmetic deposition device 100 uses the rotational position of the applicator face 104 to determine whether the roller 115 is following behind the printing nozzle rows 106A, 106B, 106C.

Mechanisms to maintain rotational alignment illustrated in FIGS. 4A, 4B, 5A, and 5B improve the usability of the cosmetic deposition device 100 for cosmetics application. The cosmetic deposition device 100 instantly and visibly augments cosmetic styles through the use of a diagnostic and rotational application system.

When the applicator face 104 is capable of rotation, the applicator face 104 can be rotated without having to rotate the entire cosmetic deposition device 100. The applicator face 104 is rotated so that the cosmetic deposition device 100 can be moved and the roller 115 follows behind the nozzle rows 106A, 106B, 106C to prevent smudging.

The applicator face 104 rotates freely and may be secured in place to any appropriate orientation for printing. To change the direction in which makeup will be applied, the user may rotate the applicator face 104, detaching it from the housing 102, until it is in a new appropriate position and reattached to the housing 102.

Applicator alignment may be achieved in several ways:

Applicator face 104 is magnetically secured to the housing 102.

Applicator face 104 is latched to and unlatched from the housing 102.

Applicator face 104 is held by spring tension and secured in position by slots on the housing 102.

Applicator face 104 snaps into place through interference fit to the housing 102.

The direction of travel and orientation of the applicator face 104 are known to the cosmetic deposition device 100 via feedback from a sensor in roller 115, position sensor 122, and applicator face 104 positions, so that the cosmetic deposition device 100 can be programmed to only apply makeup when oriented in the right direction, and the user may be prompted to make rotational adjustments.

The cosmetic deposition device 100 augments eye makeup looks through the use of a diagnostic and rotational application system.

The cosmetic deposition device 100 is configured for application of a cosmetic style to a portion of a biological surface of a subject, and comprises the cosmetic deposition assembly 110, at least one position sensor 122, a camera 124, a display 140, and processor 120 for carrying out all or part of an operation or method of the disclosure.

The position sensor 122 can detect a position of the nozzle rows 106A-C relative to the portion of the biological surface.

Circuitry of cosmetic deposition device 100, which includes but is not limited to a processor, a microprocessor, processor circuitry, and/or dedicated hardware circuitry, operably connects the cosmetic deposition assembly 110, printhead 145, applicator face 104, the position sensor 122, camera 124, and when present in an embodiment, the display 140. The circuitry is configured to direct the cosmetic deposition assembly 110 to print the cosmetic style with the printhead 145, compute the position of the cosmetic deposition device 100 relative to the portion of the biological surface based on the position sensor 122, compute the selective activation of one or more nozzles in rows 106A-C based on the position of cosmetic deposition device 100 relative to the portion of the biological surface. In embodiments, circuitry of cosmetic deposition device 100 is configurable with a processor and processor-executable instructions stored on a non-transitory machine-readable medium of cosmetic deposition device 100, as a non-limiting example.

Sensors to determine position, direction, and rotation alignment may include magnetic field sensors, Hall sensors, accelerometers, resistive sensors, inductive sensors, and the like.

In embodiments, cosmetic deposition device 100 includes a processor 120 for execution of instructions stored on a non-transitory machine-readable medium, for enabling the processor to carry out all or part of a method or process of the disclosure. In embodiments, the processor 120 is configured to receive a makeup image file, detect a position and a curvature of a portion of the surface of a subject based on the position sensor 122, and direct printhead 145 to print a cosmetic style based on the makeup image file at a location on the surface of skin. A plurality of facial features of the image of the subject are recognized, e.g., by a software application of a computing device 1000 analyzing the image. In embodiments, the plurality of facial features is recognized by the cosmetic deposition device 100, through one or more cameras 124 on the cosmetic deposition device 100. In embodiments, the depth and/or curvature of the plurality of facial features is recognized by the position sensor 122.

In embodiments, the location is determined by a cosmetic style. For example, a lipstick cosmetic style can be printed on the lips of the subject, a brow cosmetic style can be printed to the eyebrow of the subject, an eyelid shadow cosmetic style can be printed to the eyelid of the subject, and the like.

In embodiments, a position sensor is inside roller 115. In embodiments, the camera 124 is configured to capture a plurality of images as cosmetic deposition device 100 moves over a portion of skin, such as a facial feature of a subject.

In embodiments, the applicator face 104 is configured to articulate via flexible dogs 160. Articulating the applicator face 104 allows scanning a surface more accurately. In such embodiments. In operation, a position sensor within roller 115 contacts the surface and rolls as the cosmetic deposition device 100 scans the surface. In such embodiments, cosmetic deposition device 100 is able to consider the curvature of the surface.

The display 140 is configured for use as a user interface. Though display 140 is shown on the back side of cosmetic deposition device 100, in embodiments, display 140 is a separate component, such as a smartphone or tablet. In embodiments, display 140 includes one or more actuators, such as buttons or keys. In embodiments, display 140 includes a touch type capacitance button. In embodiments, display 140 is a touchscreen.

A position sensor can be configured to roll across the facial feature as cosmetic deposition device 100 is moved over the facial feature. In this manner, position sensor detects a position of the facial feature as the cosmetic deposition device 100 moves over the facial feature. In embodiments, position sensor in roller 115 is further configured to detect the curvature of the facial feature or the subject's face, i.e., the portion of the biological surface of the subject.

Formulation cartridges 119A, 119B, and 119C are configured to hold one or more cosmetic inks or dyes, or other compositions for the cosmetic style. Formulation cartridges 119A, 119B, and 119C can hold any number of colors, compositions, finishes, or formulations of the cosmetic inks or dyes.

In embodiments, cosmetic deposition device 100 processor 120 is configured to generate instructions based on one or more inputs associated with the cosmetic style that causes printhead 145 to dispense and deposit a cosmetic formulation according to the cosmetic style that is selected and modified by a subject.

Figure 6:
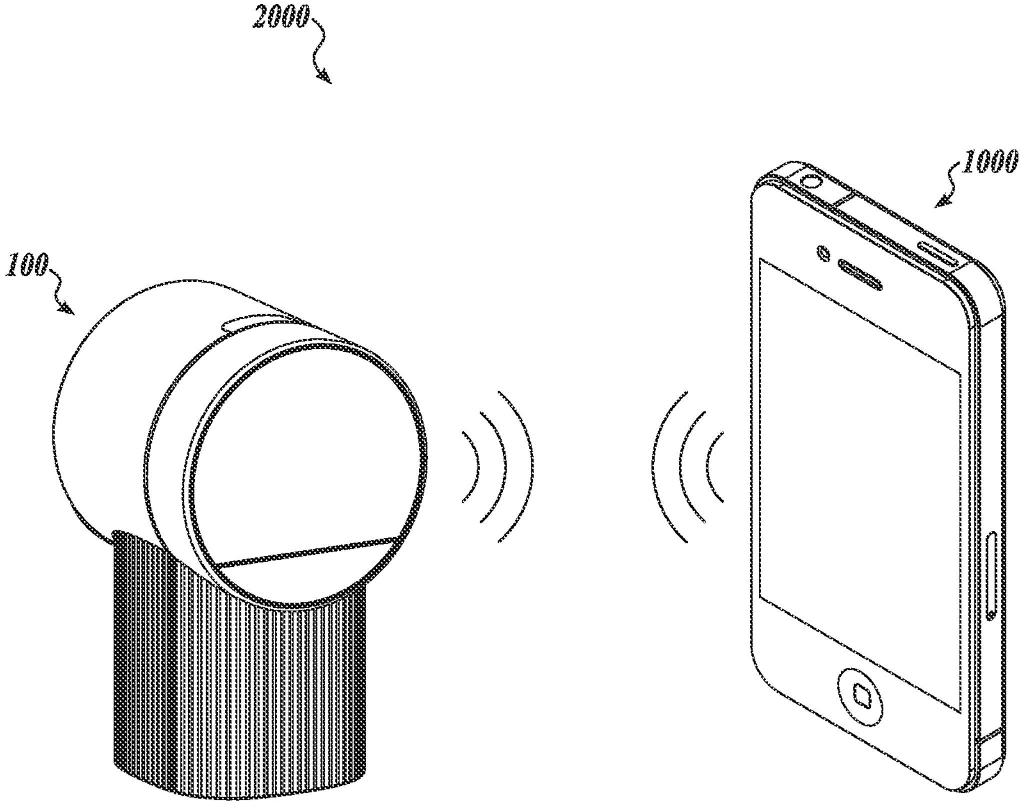
FIG. 6 is an illustration of a system including a cosmetic deposition device and computing device.

FIG. 6 is an illustration of a system 2000 for printing a cosmetic style may be implemented with the cosmetic deposition device 100 and a computing device 1000, such as a smartphone that comprises circuitry configured to select the cosmetic style from a plurality of cosmetic styles, display the cosmetic style on an image of the portion of the biological surface of the subject, and transmit the cosmetic style as a makeup image file to the cosmetic deposition device 100. The circuitry of the cosmetic deposition device 100 is operably connected (or is operably connectable) to the circuitry of the computing device 1000 and is further configured to receive the makeup image file from the computing device 1000 and direct the printhead 145 to print the cosmetic style with the formulations from the formulation cartridges through actuation of nozzles from rows 106A-C based on the makeup image file.

In example embodiments, the computing device 1000 is a smartphone or other consumer computational device and the circuitry of the computing device 1000 is configurable with a processor or microprocessor programmable with processor-executable instructions stored on a non-transitory machine-readable medium of the computing device 1000.

Accordingly, in embodiments, computing device 1000 includes a software application configured to select a cosmetic style from a plurality of cosmetic styles, display the cosmetic style on an image of a portion of skin of the subject, and transmit the cosmetic style as a makeup image file by a wireless connection, such as a Bluetooth® connection, a Bluetooth® low energy (BLE) connection, and/or a Wi-Fi® connection, and/or a wired connection.

In embodiments, a software application of the computing device 1000 depicts a plurality of cosmetic styles, such as eyebrow shapes, lip shapes, etc. on a display of the computing device 1000. A subject selects a cosmetic style from the plurality of cosmetic styles by clicking, tapping, or otherwise choosing the cosmetic style on the computing device 1000. In embodiments, the software application displays the plurality of cosmetic styles as a list or drop-down menu.

The software application on the computing device 1000 can display an image of the subject's face configured for depiction of an overlay of a cosmetic style on a biological surface of the face, for example, an eyebrow. In embodiments, the image is a live video feed from a camera of the computing device 1000 or a camera 124 of the cosmetic deposition device 100.

The computing device 1000 displays an image of the subject's face and cosmetic styles. The subject selects a cosmetic style which is displayed as an overlay on the subject's face. The subject may make adjustments or the adjustments are recommended by the computing device 1000 based on a shape of the subject's face, the shape of a facial feature of the subject, a color of the subject's hair, skin, eyes, or clothing, or a trending adjustment, e.g., an adjustment that is trending with one or a plurality of subjects. In embodiments, adjusting the selected cosmetic style includes changing a color, a size, a length, a width, a hair size, a pattern, an angle, a position, a location of the cosmetic style, or a combination thereof of the selected cosmetic style.

Once the subject is satisfied with the selected cosmetic style, the subject can transmit the cosmetic style as a makeup image file to the cosmetic deposition device 100. The subject then applies the selected and/or adjusted cosmetic style to a surface with the cosmetic deposition device 100.

The cosmetic deposition device 100 receives the makeup image file of the selected cosmetic style from the computing device 1000. The subject can hold the cosmetic deposition device 100 with the handle and move the cosmetic deposition device 100 over a surface. As cosmetic deposition device 100 is moved over the surface, cosmetic deposition device 100 detects a position and a curvature of the body based on one or more positions and directs the printhead to print the cosmetic style at a specific location.

In embodiments, the cosmetic deposition device 100 provides instructions for rotating the applicator face 104 to a predetermined position. In embodiments, the cosmetic deposition device 100 senses the direction of movement of the cosmetic deposition device 100 and stops printing if the roller 115 is sensed not to be following behind the nozzles. The cosmetic deposition device 100 provides instructions to rotate the applicator face 104 to a predetermined position. Once the applicator face 104 is sensed to be in the proper orientation, the cosmetic deposition device 100 allows printing to start or to continue.

In embodiments, the selected cosmetic style may require that the cosmetic deposition device 100 be directed in more than one direction over the surface. For example, vertically and horizontally.

In embodiments, the cosmetic deposition device 100 may provide instructions for moving the cosmetic deposition device 100 in a first direction on the surface, such as horizontally, and then provide instructions for rotating the applicator face 104, for example 90 degrees, then moving the cosmetic deposition device 100 in a second direction on the surface, such as vertically.

In embodiments, the display 140 is configured to display a printing guide in order to direct a user to properly use the cosmetic deposition device 100. The printing guide may include an arrow pointing in a direction a user can move the cosmetic deposition device 100. In embodiments, the printing guide includes a graphical representation of the facial feature and an arrow pointing in the direction a user can move the cosmetic deposition device 100.

In embodiments, the display 140 displays a current view of camera 124 on the cosmetic deposition device 100. In some embodiments, as the user moves the cosmetic deposition device 100 over the surface, an image captured by the camera 124 is displayed. In some embodiments, the printer guide further includes one or more alerts to direct the user to move the cosmetic deposition device 100. In some embodiments, the alerts are visual alerts, such as arrows, auditory alerts, such as a chime or alarm, or tactile alerts such as vibrations.

Figure 7:
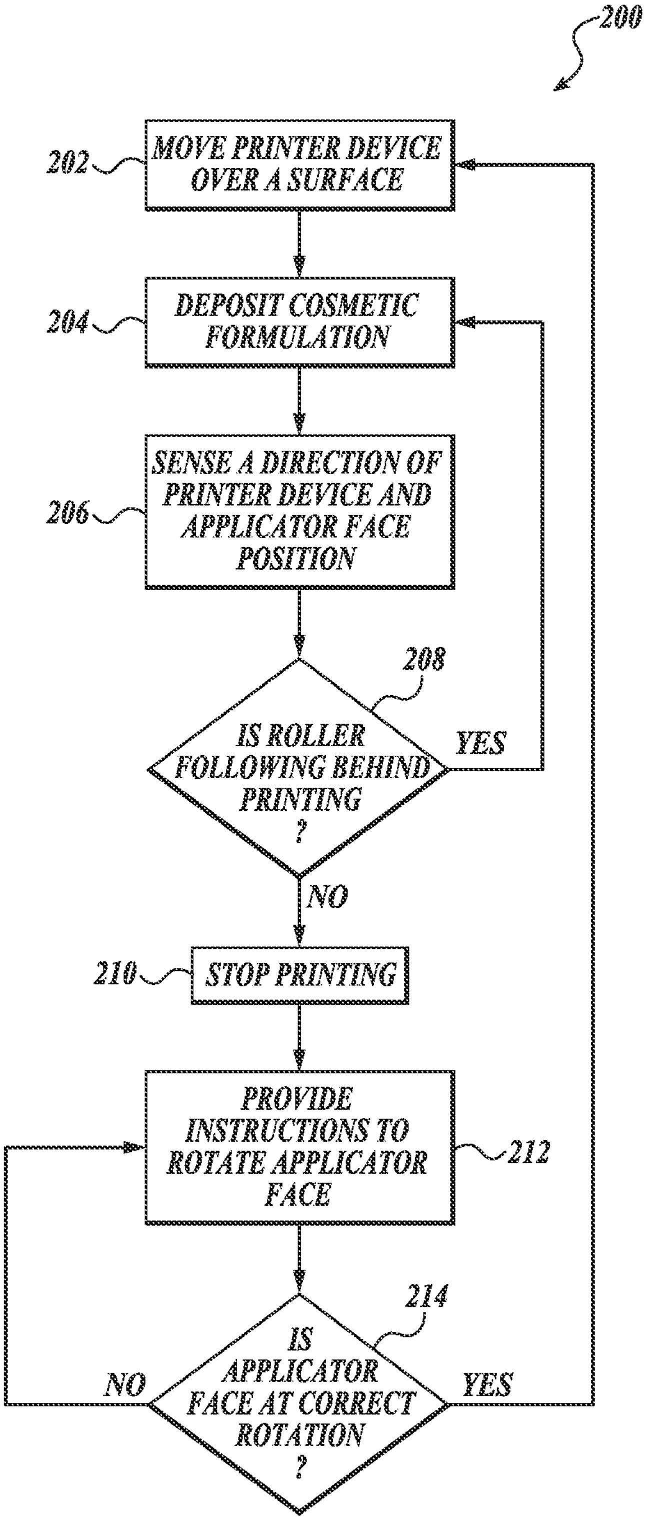
FIG. 7 is a flow diagram of a method of the cosmetic deposition device.

Referring to FIG. 7, a method 200 of printing a cosmetic style on a surface, such as facial features, is illustrated.

In block 202, the cosmetic deposition device 100 is moved over the surface to be printed with the cosmetic style.

In block 204, the cosmetic deposition device 100 prints the selected cosmetic style upon recognition of the location of the facial features.

In block 206, the cosmetic deposition device 100 senses a direction of the cosmetic deposition device 100 using a direction sensor on roller 115 coupled with a magnet, or a Hall sensor, or accelerometer sensor, and the like.

In block 208, a determination is made, based on the direction of the cosmetic deposition device 100 and the rotational position of the applicator face 104, whether or not the roller 115 is following behind the newly printed cosmetic deposition.

When the determination in block 208 is "yes" meaning the roller 115 is following behind the printing, the cosmetic deposition device 100 continues printing and returns to block 204.

When the determination in block 208 is "no" meaning the roller 115 is not following behind the newly printed cosmetic deposition, the cosmetic deposition device 100 stops printing in block 210.

In block 212, the cosmetic deposition device 100 can provide the subject with instructions to rotate the applicator face 104 to the correct position or to a predetermined position.

In block 214, a determination is made, based on a sensor that senses the applicator face 104 position, whether or not the applicator face 104 has been rotated to the correct or predetermined position. The applicator face 104 position can be sensed by the magnets 123A-H.

When the determination in block 214 is "yes" meaning the applicator face 104 is in the correct rotation position, the cosmetic deposition device 100 continues printing and returns to block 204.

When the determination in block 214 is "no" meaning the applicator face 104 is not in the correct rotation position, the cosmetic deposition device 100 may continue to provide instructions by returning to block 212.

The detailed description set forth above in connection with the appended drawings, where like numerals reference like elements, are intended as a description of various embodiments of the present disclosure and are not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps or combinations of steps, or the order of steps can be re-arranged, in order to achieve the same or substantially similar result. Generally, the embodiments disclosed herein are non-limiting, and the inventors contemplate that other embodiments within the scope of this disclosure may include structures and functionalities from more than one specific embodiment shown in the figures and described in the specification.

In the foregoing description, specific details are set forth to provide a thorough understanding of exemplary embodiments of the present disclosure. It will be apparent to one skilled in the art, however, that the embodiments disclosed herein may be practiced without embodying all the specific details. In some instances, well-known process steps have not been described in detail in order not to unnecessarily obscure various aspects of the present disclosure. Further, it will be appreciated that embodiments of the present disclosure may employ any combination of features described herein.

The present application may include references to directions, such as "vertical," "horizontal," "front," "rear," "left," "right," "top," and "bottom," etc. These references, and other similar references in the present application, are intended to assist in helping describe and understand the particular embodiment (such as when the embodiment is positioned for use) and are not intended to limit the present disclosure to these directions or locations.

While illustrative embodiments have been illustrated and described, it will be appreciated that various changes can be made therein without departing from the spirit and scope of the invention.

The embodiments of the invention in which an exclusive property or privilege is claimed are defined as follows:

1. A cosmetic deposition device, comprising:

a housing;

a printhead within the housing, the printhead including one or more nozzle to dispense one or more formulation;

an applicator face connected to the housing, wherein an exterior side of the applicator face includes a roller adjacent to the one or more nozzle, and the applicator face is configured to rotate with respect to the housing, and the applicator face is detained at more than one rotational setting with respect to the housing.

2. The cosmetic deposition device of claim 1, comprising one or more magnet on the applicator face and one or more magnet on the housing, wherein the one or more magnet on the applicator face and the one or more magnet on the housing provide an attraction force to detain the applicator face with respect to the housing when the one or more magnet on the applicator face is adjacent to the one or more magnet on the housing.

3. The cosmetic deposition device of claim 2, wherein the one or more magnet on the applicator face or the one or more magnet on the housing are used to determine a rotation position of the applicator face.

4. The cosmetic deposition device of claim 2, wherein the one or more magnet on the applicator face and the one or more magnet on the housing are at the same radial distance from a center of the housing.

5. The cosmetic deposition device of claim 1, comprising one or more pairs of diametrically opposed magnets on the applicator face and one or more pairs of diametrically opposed magnets on the housing.

6. The cosmetic deposition device of claim 1, comprising one or more magnet on an upper side of the applicator face and one or more magnet on a bottom side of the housing.

7. The cosmetic deposition device of claim 1, comprising one or more spring on the applicator face and one or more slot on the housing, wherein the one or more spring on the applicator face and the one or more slot on the housing detain the applicator face at the more than one rotation setting when the one or more spring is engaged on the one or more slot.

8. The cosmetic deposition device of claim 7, wherein the applicator face comprises one or more pairs of diametrically opposed springs and a plurality of slots are provided around an inner circumference of the housing.

9. The cosmetic deposition device of claim 8, wherein the inner circumference of the housing comprises the slots equally spaced along the inner circumference.

10. The cosmetic deposition device of claim 7, further comprising a magnetic field sensor to determine a rotation position of the applicator face.

11. The cosmetic deposition device of claim 1, wherein a bottom of the housing includes more than one dogs to support the applicator face, a dog including an axially extending neck and a radially extending flange, and the applicator face includes a rim that is engaged with the more than one dogs.

12. The cosmetic deposition device of claim 1, wherein the applicator face includes an opening for the one or more nozzle to dispense one or more formulation therethrough.

13. A method of printing a cosmetic style, comprising:

moving a cosmetic deposition device over a surface, wherein the cosmetic deposition device includes a printer and an applicator face including a roller, wherein the roller makes contact with the surface;

sensing a direction of the cosmetic deposition device; and depositing a formulation on the surface when the roller is following behind the printer.

14. The method of printing a cosmetic style of claim 13, wherein the surface includes a facial feature.

15. The method of printing a cosmetic style of claim 13, wherein the cosmetic style is an eyebrow feature or a lip feature.

16. The method of printing a cosmetic style of claim 13, further comprising:

when the roller is not following behind the printer, the device stops depositing the formulation on the surface.

17. A method of printing a cosmetic style, comprising:

moving a cosmetic deposition device over a surface, wherein the cosmetic deposition device includes a printer and an applicator face including a roller, wherein the roller makes contact with the surface;

via a computing device, providing instructions to rotate the applicator face to a predetermined position;

sensing a rotation position of the applicator face is at the predetermined position; and when the rotation position of the applicator face is at the predetermined position, depositing a formulation on the surface.

18. The method of printing a cosmetic style of claim 17, further comprising:

sensing a direction of the cosmetic deposition device when being moved over a surface; and when the roller is not following behind the printer, the cosmetic deposition device stops depositing the formulation on the surface.

19. The method of printing a cosmetic style of claim 17, further comprising:

via a computing device, providing a first instruction to move the cosmetic deposition device in a first direction; and after detecting that the cosmetic deposition device has moved in the first direction, providing, via the computing device, a second instruction to move the cosmetic deposition device in a second direction.

* * * * *